United States Patent
Minemura et al.

(10) Patent No.: US 8,552,603 B2
(45) Date of Patent: Oct. 8, 2013

(54) ELECTRIC ROTATING MACHINE WITH COOLING MECHANISM

(75) Inventors: Akitoshi Minemura, Nishio (JP); Hirohito Matsui, Okazaki (JP); Naoki Hakamada, Anjo (JP); Kazuya Onuki, Chita-gun (JP); Shinji Kouda, Kariya (JP); Takashi Matsumoto, Toyota (JP)

(73) Assignees: Nippon Soken, Inc., Nishio (JP); Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 301 days.

(21) Appl. No.: 12/975,982

(22) Filed: Dec. 22, 2010

(65) Prior Publication Data

US 2011/0156508 A1 Jun. 30, 2011

(30) Foreign Application Priority Data

Dec. 24, 2009 (JP) ................................. 2009-293030

(51) Int. Cl.
*H02K 9/00* (2006.01)
*H02K 9/19* (2006.01)

(52) U.S. Cl.
CPC ....................................... *H02K 9/19* (2013.01)
USPC ................................. 310/54; 310/52; 310/59

(58) Field of Classification Search
CPC .............. H02K 9/19; H02K 5/20; H02K 3/22
USPC ............................................... 310/52, 54, 59
See application file for complete search history.

(56) References Cited

U.S. PATENT DOCUMENTS

| | | | | |
|---|---|---|---|---|
| 3,241,331 A | * | 3/1966 | Endress et al. ................... | 62/117 |
| 4,322,645 A | * | 3/1982 | Spirk et al. ......................... | 310/58 |
| 5,372,213 A | * | 12/1994 | Hasebe et al. ................ | 180/65.6 |
| 5,889,342 A | * | 3/1999 | Hasebe et al. ................... | 310/54 |
| 6,504,273 B2 | * | 1/2003 | Tong ................................. | 310/58 |
| 6,592,202 B2 | * | 7/2003 | Udagawa et al. ................ | 347/40 |
| 6,639,334 B2 | * | 10/2003 | Chen et al. ....................... | 310/54 |
| 6,879,069 B1 | * | 4/2005 | Weidman et al. ................ | 310/61 |
| 6,982,506 B1 | * | 1/2006 | Johnsen ........................... | 310/61 |
| 7,402,923 B2 | * | 7/2008 | Klemen et al. ................... | 310/54 |

(Continued)

FOREIGN PATENT DOCUMENTS

| JP | S56-108217 | 8/1981 |
|---|---|---|
| JP | 4167886 | 8/2008 |

OTHER PUBLICATIONS

Chinese Office Action dated Oct. 10, 2012, issued in corresponding Chinese Application No. 201010622533.5 with English translation.

*Primary Examiner* — John K Kim
(74) *Attorney, Agent, or Firm* — Nixon & Vanderhye PC

(57) ABSTRACT

An electric rotating machine is provided which includes a stator in which a coil is so wound as to have an coil end and a coolant channel. The coolant channel has defined therein a flow path through which coolant flows and a flow separator disposed in the flow path and a first and a second coolant outlet. The flow separator works to separate a flow of the coolant into at least a first and a second coolant streams. The first coolant outlet communicates with the first coolant stream, while the second coolant outlet communicates with the second coolant stream. The first and second coolant outlets drain the coolant to different portions of the coil end, thereby cooling almost the whole of the coil end even when the electric rotating machine is tilted undesirably.

9 Claims, 7 Drawing Sheets

(56) References Cited

U.S. PATENT DOCUMENTS

| | | |
|---|---|---|
| 7,545,060 B2 * | 6/2009 | Ward .............................. 310/54 |
| 7,763,996 B2 * | 7/2010 | Dawson et al. ................. 310/58 |
| 7,808,135 B2 * | 10/2010 | Salamah et al. ................ 310/59 |
| 8,169,110 B2 * | 5/2012 | Swales et al. ................... 310/54 |
| 8,269,383 B2 * | 9/2012 | Bradfield ........................ 310/58 |
| 2007/0063592 A1 * | 3/2007 | Pashnik et al. .................. 310/54 |
| 2010/0264760 A1 * | 10/2010 | Matsui et al. ................... 310/54 |
| 2011/0156508 A1 * | 6/2011 | Minemura et al. .............. 310/54 |

\* cited by examiner

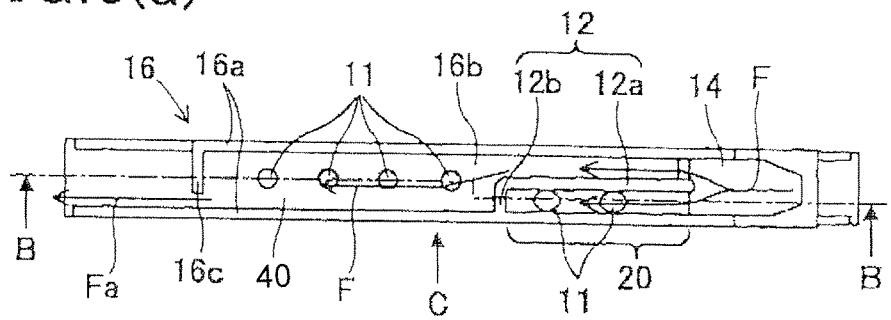
FIG.8(a)
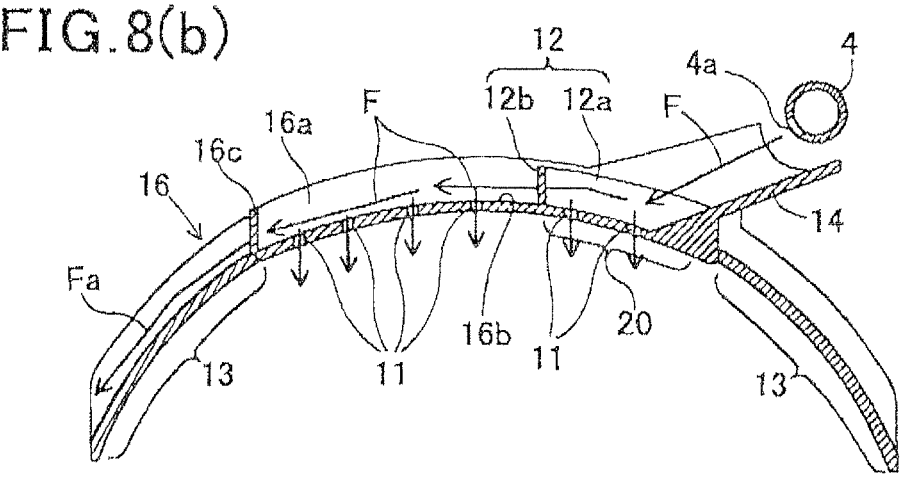
FIG.8(b)
FIG.9
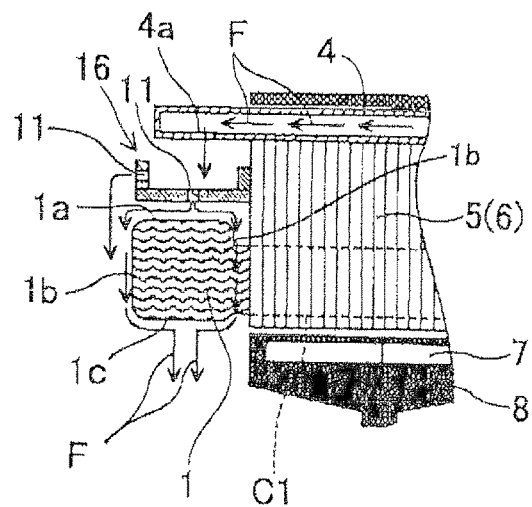

ELECTRIC ROTATING MACHINE WITH COOLING MECHANISM

CROSS REFERENCE TO RELATED DOCUMENT

The present application claims the benefit of priority of Japanese Patent Application No. 2009-293030 filed on Dec. 24, 2009, the disclosure of which is incorporated herein by reference.

BACKGROUND

1. Technical Field of the Invention

The present invention relates generally to an electric rotating machine with a cooling mechanism which is designed to ensure cooling ability in supplying coolant to coil ends of a stator of the electric rotating machine even when the electric rotating machine is tilted in any direction.

2. Background Art

Japanese Patent No. 4167886 teaches a cooling mechanism for cooling coil ends of a stator installed in an electric rotating machine. The cooling mechanism includes arc-shaped coolant channels to which a liquid coolant is fed. Each of the coolant channels has openings formed in a bottom thereof as coolant outlets from which the coolant is drained onto a corresponding one of the coil ends. The coolant channel also has hollow cylindrical guides joined to the outlets, respectively, to guide streams of the coolant into selected portions of the coil end in order to ensure the capability of the cooling mechanism in cooling the coil end.

The electric rotating machine is usually tilted for some reason in either of opposite horizontal directions in which an rotating axis of the electric rotating machine is inclined. In order to ensure the cooling capability in such an event, the coolant outlets are arranged in two lines, with the outlets being staggered between the two lines in a lengthwise direction of the coolant channel. When the electric rotating machine is tilted in either of the horizontal directions, the coolant is drained at least from either of the two-line coolant outlets, thereby assuring the draining of the coolant onto the coil end.

The electric rotating machine may, however, be tilted in another direction in which the axis is merely turned without being inclined. The cooling mechanism is so designed that the coolant is supplied to the central top of the arc-shaped coolant channel. When the electric rotating machine is tilted in the above axis-turning direction, it may, therefore, result in a failure in draining the coolant from either of opposed ends of the coolant channel onto a portion of the coil end.

The coolant outlets of the coolant channel are located just above an outer circumferential surface of the coil end. The coolant drops from the cylindrical guides and flows downward along the outer circumferential surface of the coil end and, thus, hardly reaches an outer or an inner surfaces of the coil end which are opposed in the axial direction of the coil end, which may result in a lack in cooling the coil end as a whole.

The above cooling mechanism, therefore, has the problem in that the cooling capability may be deteriorated depending upon a direction in which the electric rotating machine is tilted.

SUMMARY

It is therefore a principal object of the invention to avoid the disadvantages of the prior art.

It is another object of the invention to provide an improved structure of an electric rotating machine with a cooling mechanism designed to ensure the cooling ability in supplying coolant to a coil end of a stator of the electric rotating machine even when the electric rotating machine is tilted in a given direction.

According to one aspect of the invention, there is provided an electric rotating machine which may be employed as an electric motor or an electric generator. The electric rotating machine comprises: (a) a rotor; (b) a rotating shaft which is to be rotated by the rotor; (c) a stator which faces a circumference of the rotor, the stator having formed therein a plurality of slots through which a coil is so wound as to have a coil end extending outside an end of the stator in an axial direction of the stator; (d) a coolant channel which has defined therein a flow path through which coolant flows; (e) a coolant supplying mechanism which supplies the coolant to the coolant channel; (f) a flow separator disposed in the flow path, the flow separator working to separate a flow of the coolant into at least two streams; and (g) a first and a second outlet. The first outlet communicates with a first coolant stream that is one of the two streams, as produced by the flow separator. The second outlet communicates with a second coolant stream that is the other of the two streams. The first and second outlets drain the coolant to different portions of the coil end.

Specifically, the flow separator of the coolant channel works to split a flow of the coolant into two streams: the first coolant stream and the second coolant stream. The first coolant stream flows toward the first outlet, while the second coolant stream flows toward the second outlet, thereby cooling almost the whole of the coil end effectively even when the electric rotating machine is tilted undesirably.

In the preferred mode of the invention, the flow separator is made of a plate which has a given height and extends in a direction in which the coolant flows in the flow path to split the flow of the coolant into the first and second coolant streams.

The flow separate may alternatively be made of a wedge-shaped protrusion to define a chamber into which the first coolant flow enters. The first outlet opens into the chamber.

The coolant channel may also include an extension which defines an additional flow path from which the coolant is partially drained onto the coil end. The additional flow path extends below the first and second outlets in a direction of gravitational force, thereby permitting a portion of the coolant to drop directly onto a lower portion of the coil end and also to right and left circumferential portions of the coil end.

The coolant channel may include an inlet guide through which the coolant flows from the coolant supplying mechanism to the flow path in the coolant channel. The inlet guide ensures the stability in supplying the coolant to the flow path of the coolant channel even when the electric rotating machine is tilted undesirably.

The extension is elongated in a lengthwise direction of the coolant channel. The extension faces a circumferential surface of the coil end and is away from the circumferential surface at a given interval which is so selected as to create capillary action which attracts the coolant partially into an air gap between the extension and the circumferential surface of the coil end to cool a circumferential portion of the coil end additionally.

The extension may have a channel which directs a portion of the second coolant stream to a portion of the circumference of the coil end.

The coolant channel has a side wall in which the first and second coolant outlets are formed.

The coolant channel may also have a third coolant outlet formed in a bottom of the coolant channel.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 8(a) is a top view which illustrates a coolant channel to be installed in the electric rotating machine of FIG. 1 according to the third embodiment of the invention;

FIG. 8(b) is a longitudinal sectional view of the coolant channel, as taken along the line B-B in FIG. 8(a);

FIG. 9 is a partially enlarged sectional view of the coolant channel of FIGS. 8(a) and 8(b) which demonstrates how streams of coolant flow;

DESCRIPTION OF THE PREFERRED EMBODIMENTS

Figure 1:
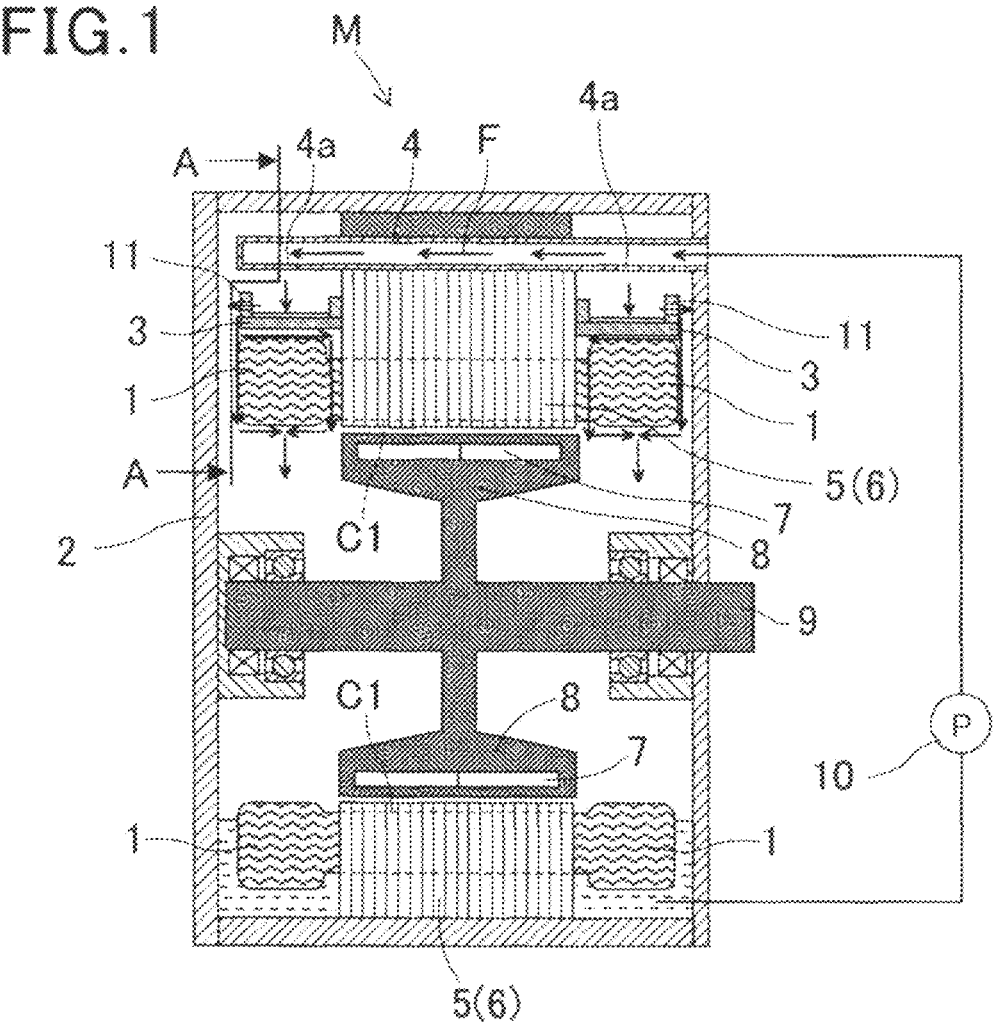
FIG. 1 is a longitudinal sectional view which shows an electric rotating machine with a cooling mechanism according to the first embodiment of the invention.
Figure 2:
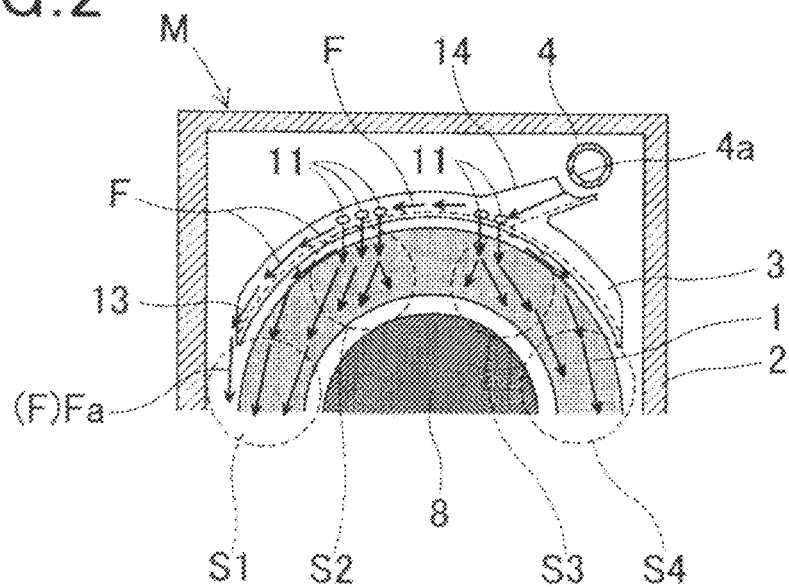
FIG. 2 is an enlarged sectional view, as taken along the line A-A in FIG. 1.
Figure 3A:
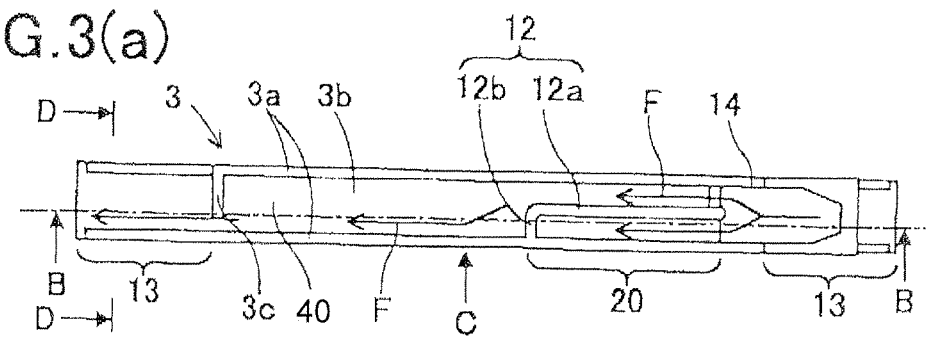
FIG. 3(a) is a top view which illustrates a coolant channel installed in the electric rotating machine of FIG. 1.
Figure 3B:
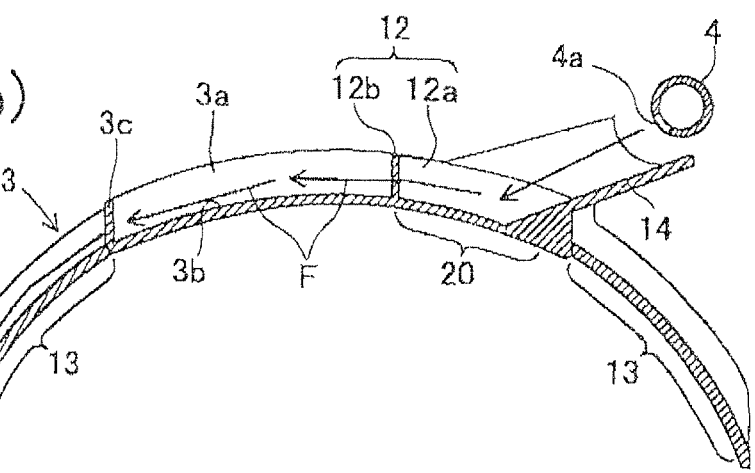
FIG. 3(b) is a longitudinal sectional view of the coolant channel, as taken along the line B-B in FIG. 3(a)
Figure 3C:
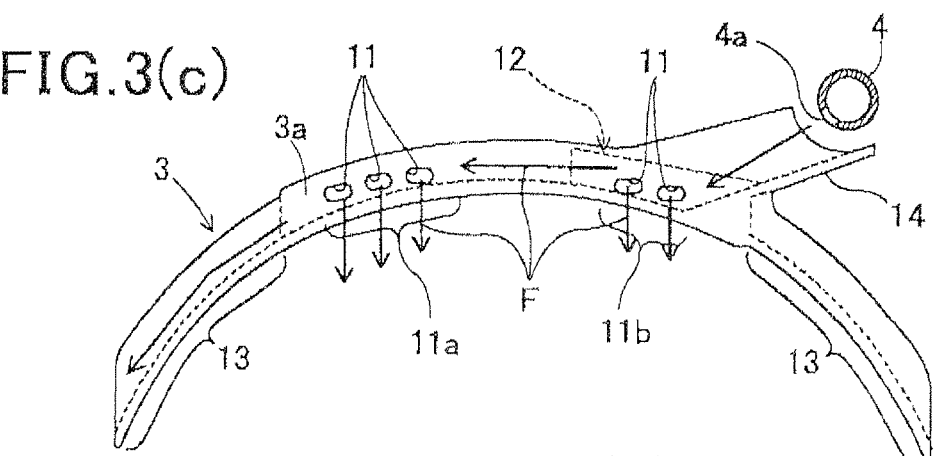
FIG. 3(c) is a side view of the coolant channel, as viewed from an arrow C in FIG. 3(a)
Figure 3D:
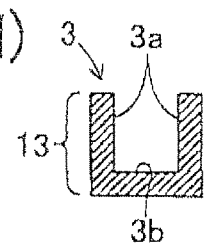
FIG. 3(d) is a transverse sectional view of the coolant channel, as taken along the line D-D in FIG. 3(a)
Figure 3E:
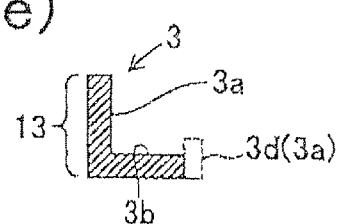
FIG. 3(e) is a transverse sectional view which illustrates a modification of the coolant channel of FIG. 3(a)
Figure 4A:
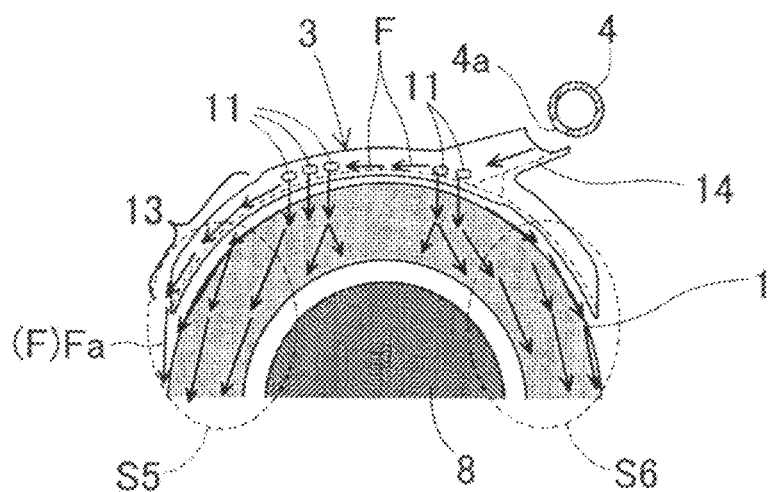
FIG. 4(a) is a partially side view which demonstrates streams of coolant from a coolant channel to a coil end when the electric rotating machine of FIG. 1 is placed in a normal orientation.
Figure 4B:
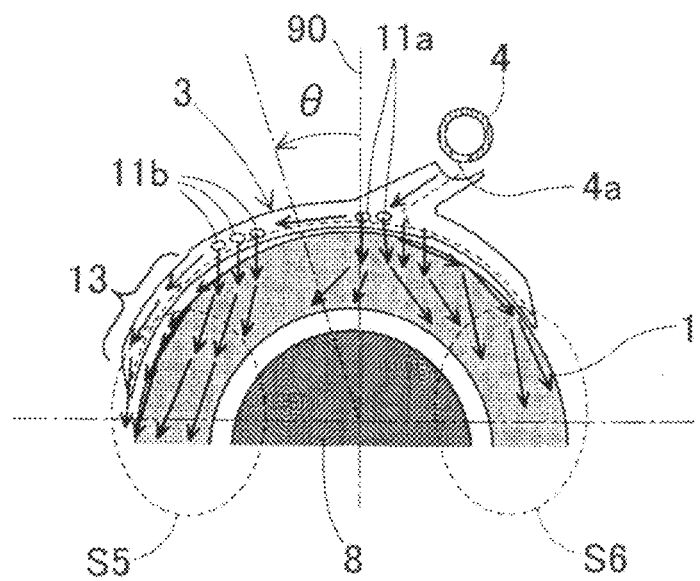
FIG. 4(b) is a partially side view which demonstrates streams of coolant from a coolant channel to a coil end when the electric rotating machine of FIG. 1 is tilted.
Figure 5:
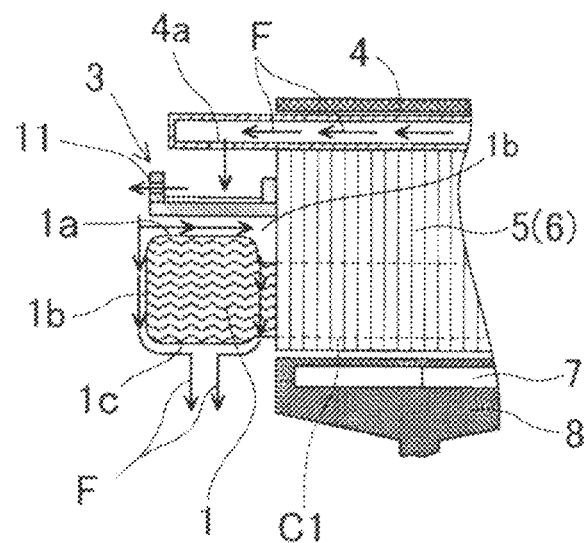
FIG. 5 is a partially enlarged sectional view of the electric rotating machine of FIG. 1 which demonstrates how streams of coolant flow.
Figure 6:
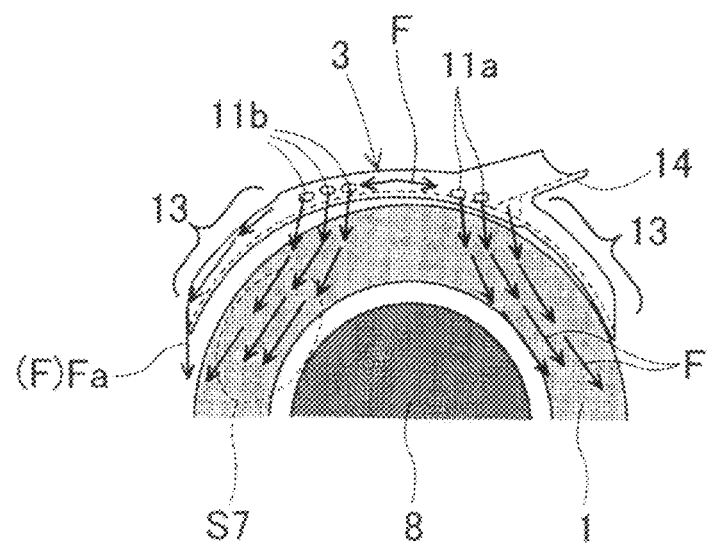
FIG. 6 is a partially side view of the electric rotating machine of FIG. 1 along which streams of the coolant move.

Referring to the drawings, wherein like reference numbers refer to like parts in several views, particularly to FIG. 1, there is shown an electric rotating machine M according to the first embodiment of the invention. FIG. 2 is an enlarged sectional view, as taken along the line A-A in FIG. 1. FIGS. 3(a), 3(b), 3(c), 3(d), and 3(e) illustrate coolant channels 3 which define paths through liquid coolant flows. FIGS. 4(a) and 4(b) are explanatory views demonstrating streams of the coolant. FIG. 5 is a partially enlarged sectional view of the electric rotating machine M of FIG. 1 which demonstrates how streams of the coolant flow. FIG. 6 is a partially side view of the electric rotating machine M of FIG. 1 along which streams of the coolant move. The electric rotating machine M is usually placed in an orientation, as illustrated in FIG. 1, so that the coolant flows downward, as viewed in the drawing, by gravity.

The electric rotating machine M is used as an electric generator or an electric motor. The electric rotating machine M is, as illustrated in FIG. 1, equipped with a casing 2 (also called a frame or housing), a stator 6, a rotor 8, a rotating shaft 9 (i.e., a power input/output shaft), a coil C1, the coolant channels 3, and a coolant supply pipe 4. The stator 6, the rotor 8, the rotating shaft 9, the coil C1, the coolant channels 3, and the coolant supply pipe 4 are disposed inside the casing 2. The electric rotating machine M is also equipped with a pump 10 and a cooling device (not shown) such as an oil cooler which are disposed outside the casing 2.

The rotor 8 is retained by bearings within the casing 2 to be rotatable along with the rotating shaft 9. The rotor 8 is formed integrally with the rotating shaft 9, but may alternatively be made of a separate member welded, glued, or joined mechanically to the rotating shaft 9 through threads, bolts, or another similar mechanism.

The stator 6 which is made of an electromagnet (or a permanent magnet) is disposed around the outer circumference of the rotor 8. The stator 6 has comb-like teeth 5 which define slots (not shown), each between adjacent two of the teeth 5. Conductive wire is wound through the slots to form the coil C1 (i.e., a stator coil). Specifically, the coil C1 is made up of a plurality of turns of the wire with opposed folded portions of each turn disposed outside opposed ends of a core of the stator 6 to form so-called coil ends 1. The coil C1 is of a hollow cylindrical shape. The coil ends 1 of the coil C1 extend from the opposed ends of the core of the stator 6 in opposite directions in parallel to the axis of the electric rotating machine M (i.e., the length of the rotating shaft 9).

The coolant supply pipe 4 is disposed in a top portion (i.e., an upper portion, as viewed in FIG. 1) of the casing 2 to direct the liquid coolant such as oil, as supplied from the pump 10, to the coolant channels 3. The coolant supply pipe 4 is of a hollow cylindrical shape and has formed therein coolant outlets 4a, one located just above each of the coolant channels 3, to drop the coolant to the coolant channels 3. The coolant supply pipe 4 may have the two or more coolant outlets 4a for each of the coolant channels 3. Arrows F in FIG. 1 represent paths of flows of the coolant. The same applies to other drawings. The coolant, as fed from the pump 10 to the coolant supply pipe 4, drain from the coolant outlets 4a to the coolant channels 3 and then drops onto the coil ends 1. A combination of the coolant supply pipe 4 and the pump 10 servers as a coolant supply mechanism.

The coolant channels 3 are of a U-shape in transverse cross section and disposed one for each of the coil ends 1 within the casing 2. The electric rotating machine M is, as described above, mounted in, for example, an automotive vehicle with the rotating shaft 9 extending horizontally. The coolant channels 3 are disposed between the coolant supply pipe 4 and the coil ends 1 of the stator 6 of the electric rotating machine M. The bottoms of the coolant channels 3 face upper surfaces of the coil ends 1, as viewed from the drawing, in other words, are located just above the coil ends 1. The coolant channels 3 are identical in structure expect for being mirror-symmetrical to one another. The following discussion will, therefore, refer to only one of the coolant channels 3. The structure of the coolant channels 3 will be described below with reference to FIGS. 2 to 3(e). FIG. 3(a) is a plane view of the coolant channel 3. FIG. 3(b) is a longitudinal section view, as taken along the line B-B in FIG. 3(a). FIG. 3(c) is a side view, as viewed from an arrow C in FIG. 3(a). FIGS. 3(d) and 3(e) are transverse sectional views, as taken along the line D-D in FIG. 3(a).

The coolant channel 3 is, as can be seen from FIG. 2, curved in the form of an arc along the curvature of an outer circumference of the coil end 1. In other words, the radius of curvature of the coolant channel 3 (i.e., the bottom surface thereof) is substantially identical with that of the circumference of the coil end 1 (i.e., coil C1). The coolant channel 3 has an inlet guide 14 which guides a flow of the coolant from the coolant supply pipe 4 to above the top of the coolant channel 3.

The coolant channel 3 has, as clearly illustrated in FIGS. 3(a) and 3(b), a body made up of side walls 3a and a bottom 3b, a flow separator 12, a partition wall 3c, and extensions 13. The flow separator 12 is made up of a flow split wall 12a and an end wall 12b. The flow split wall 12a serves to split a flow of the coolant from the inlet guide 14 into two streams. The end wall 12b serves as a stopper to block or stop a stream of the coolant which is one of the two streams produced by the flow split wall 12a to create a pool of the coolant. The flow split wall 12a and the end wan 12b are made of a one-piece plate whose height is substantially identical with that of the side walls 3a.

The flow split wall 12a also serves as a partition wall to define a chamber 20 along with the end wall 12b and the body of the coolant channel 3 (i.e., the side wall 3a and the bottom 3b). The partition wall 3c extends from one of the side walls 3a inside the coolant channel 3 to define a chamber 40 along with the body of the coolant channel 3 downstream of the chamber 20. In other words, the partition wall 3c, like the flow separator 12, separates a space existing downstream of the chamber 20 within the coolant channel 3 into two: one being the chamber 40 and the other being an inner chamber of one of the extensions 13 located downstream of the partition wall 3c. The flow separator 12 and the partition wall 3c, therefore, create two pools of the coolant. The side wall 3a, as illustrated in FIG. 3(c), has coolant outlets 11 from which the coolant is drained onto the coil end 1. The coolant outlets 11 are broken down into left and right groups 11a and 11b which will also be referred to as a first and a second group below. The right group 11b of the outlets 11 communicates with the chamber 20. The left group 11a of the outlets 1 communicates with the chamber 40. The coolant drained from the left group 11a of the outlets 11 drops onto and flows along a left half of the coil end 1 to cool, as illustrated in FIG. 2, left portions S1 and S2 of the coil end 1. Similarly, the coolant drained from the right group 11b of the outlets 11 drops onto and flows along a right half of the coil end 1 to cool, as illustrated in FIG. 2, right portions S3 and S4 of the coil end 1. Each of the left and right groups 11a and 11b may have at least one outlet 11.

The left and right groups 11a and 11b of the outlets 11 are preferably designed to be different from each other in size, shape, and/or number of the outlets 11 in light of a possible tilting of the electric rotating machine M. For example, the outlets 11 may be made to be circular or oval or have open areas different from each other between the left and right groups 11a and 11b. Further, the left and right groups 11a and 11b may be different in number of the outlets 11 therebetween. It is advisable that the left and right groups 11a and 11b be different in configuration and/or number of the outlets 11 from each other so as to minimize a change in difference in total flow rate of the coolant to be drained from the left and right groups 11a and 11b between when a vertical center line 90 of the electric rotating machine M placed in a normal orientation where the vertical center line 90 extends, as illustrated in FIG. 4(b), perpendicular to a longitudinal center line (i.e., a length) of the rotating shaft 9) is in parallel to the direction of gravitational force and when the vertical center line 90 is inclined at an angle θ to the direction of gravitational force. Note that the angle θ to is a possible maximum angle at which the electric rotating machine M is to be tilted when being mounted in, for example, an automotive vehicle.

FIG. 3(b) is, as described above, a longitudinal section view of the coolant channel 3. FIG. 3(d) is a transverse sectional view of the coolant channel 3. Each of the extensions 13 of the coolant channel 3 is, as illustrated in FIG. 3(d), of a U'-shape in transverse cross section. The body of the coolant channel 3 is identical in sectional configuration with the extensions 13. Each of the extensions 13 and the body of the coolant channel 3 may alternatively be designed to have a semicircular (or a half-pipe), a V-, or a W-shape in transverse cross section. Each of the extensions 13 may also be designed to have another shape in transverse cross section as long as it directs a flow of the coolant downward of the coil end 1 (i.e., to a lower half of the coil end 1). FIG. 3(e) illustrates a modification of each of the extensions 13. The extension 13 is of an L-shape in transverse cross section and may have a side wall 3d, as indicated by a broken line, which is smaller in height than the side wall 3a, as indicated by a solid line, (i.e., a left one, as viewed in the drawing). The lower side wall 3d, as indicated by the broken line in FIG. 3(e), determines a volume of the coolant which is required to flow through the extension 13 (i.e., a rate at which the coolant is required to flow through the extension 13). If an excess amount of the coolant is supplied into the extension 13, it will cause an amount of the coolant exceeding the required volume to spill over the lower side wall 3d onto an upper portion of the coil end 1. The use of the lower side wall 3d enables a required amount of the coolant to be supplied to the lower portion of the coil end 1 and an excess amount of the coolant to be supplied to the upper portion of the coil end 1.

The extensions 13 continue from lower ends of the body of the coolant channel 3 and are located below the outlets 11. The extensions 13 work to drop, as described later in detail with reference to FIG. 6, an amount of the coolant, which has flowed from above without being drained from the outlets 11, onto the lower portion of the coil end 1. The coolant channel 3 including the extension 13, as described above, has substantially the same radius of curvature as that of the coil end 1 and extends, as can be seen from FIG. 2, along the circumferential surface of the coil end 1 through a given air gap. The size of the air gap (i.e., an interval or distance between the bottom surface of the extension 13 and the circumferential surface of the coil end 1) is so selected as to create the capillary action (i.e., capillary force) which provides a route for flow of a portion of the coolant, as having been drained from the outlets 11 or overflowed from the inlet guide 14 or the side wall 3a of the coolant channel 3, into the gap between the extension 13 and the circumferential surface of the coil end 1, in other words, which attracts the coolant partially into the gap between the extension 13 and the circumferential surface of the coil end 1, thereby enhancing the effects in cooling an upper portion of the coil end 1.

The electric rotating machine M may be tilted to the angle θ, as demonstrated in FIG. 4(b), from the orientation, as illustrated in FIG. 1. FIG. 4(a) is a partial side view of the coolant channel 3 and the coil end 1 which demonstrates streams of the coolant when the electric rotating machine M is in the normal orientation without being inclined (i.e., in the orientation as illustrated in FIG. 1). FIG. 4(b) is a partial side view of the coolant channel 3 and the coil end 1 which demonstrates streams of the coolant when the electric rotating machine M is tilted at the angle θ from the normal orientation of FIG. 4(a).

When the electric rotating machine M is in the normal orientation, as illustrated in FIG. 4(a), the coolant supply pipe 4 and the coolant channels 3 remain unchanged in orientation thereof. The coolant, as supplied from the coolant supply pipe 4, is evenly distributed to the right and left of the coil end 1. Specifically, a flow of the coolant, as having been supplied from the coolant supply pipe 4 through the inlet guide 14, is divided, as described above with reference to FIG. 3(a), by the flow separator 12 into two streams. One of the stream enters the chamber 20 and then drains from the right group 11b of the outlets 11 onto a right portion of the coil end 1, while the other stream flows into the chamber 40 and then drains from the left group 11a of the outlets 11 onto a left portion of the coil end 1. This causes substantially the same amounts of the coolant to be supplied to the left portion S5 and the right portion 56 of the coil end 1. A portion of the coolant, as not having been drained from the left group 11a of the outlets 11, drops from the extension 13, as illustrated by an arrow Fa, and then flows along the left lower portion of the coil end 1. The whole of the coil end 1 is, therefore, cooled by the coolant. When a relatively great amount of the coolant is supplied to the coolant channel 3, a portion thereof flows into a right one of the extensions 13, as viewed in FIG. 4(a), and then drops onto a right lower portion of the coil end 1.

When the electric rotating machine M is tilted, as illustrated in FIG. 4(b), at the angle θ from the normal orientation of FIG. 4(a) in a counterclockwise direction, as viewed in the drawing, the coolant supply pipe 4 and the coolant channels 3 are also inclined at the same angle θ. The coolant, as having flowed from the coolant supply pipe 4, is, like in the case of FIG. 4(a), split by the flow separator 12 (i.e., the flow split wall 12a), as illustrated in FIG. 3(a), into two streams: one of which continues to flow to the left, as viewed from the drawing, and then drains out of the left group 11a of the outlets 11 and other of which is stopped at the end wall 12b and then drains out of the right group 11b of the outlets 11. In short, the coolant is separated into two streams and distributed by the flow separator 12 to the left and right groups 11a and 11b of the outlets 11 and then drained, as illustrated in FIG. 4(b), onto the left portion 55 and the right portion 56 of the coil end 1. A change in difference in total flow rate of the coolant to be drained onto the left portion 55 and the right portion S6 of the coil end 1 between when the electric rotating machine M is placed in the normal orientation and when it is tilted may be minimized by regulating a ratio of a total open area of the left group 11a of the outlets 11 to that of the right group 11b of the outlets 11. The cooling mechanism of this embodiment ensures the stability in cooling the whole of the coil ends 1 of the electric rotating machine M regardless of whether the electric rotating machine M is tiled or not.

The outlets 11 are, as already described with reference to FIG. 3(c), formed in the side wall 3a of the coolant channel 3. FIG. 5 is a partially enlarged view of FIG. 1 which represents flows of the coolant when the coil end 1 is viewed from a direction different from that in FIGS. 4(a) and 4(b). Most of the coolant, as drained from the outlets 11 of the coolant channel 3, flows along the outer side surface 1b and drops from the inner circumferential surface 1c (i.e. a lower surface, as viewed in the drawing) of the coil end 1. A portion of the coolant, as drained from the outlets 11, moves from an edge of the outer side surface 1b to the outer surface 1a of the coil end 1 beneath the bottom 3b of the coolant channel 3 due to viscosity thereof (i.e., the capillary action), and to the inner side surface 1b of the coil end 1 and then drops from the inner circumferential surface is of the coil end 1. The distribution of the coolant to almost the entire surface of the coil end 1 may be achieved and controlled by regulating open areas of the outlets 11.

An amount of the coolant which has not been drained from the outlets 11, as illustrated in FIG. 3(c), drops along the extension 13. The flow of the coolant along the extension 13 will be described with reference to FIG. 6. The coolant, as having drained from the outlets 11, flows along the coil end 1, as indicated by arrows F. When the electric rotating machine M is operating, the temperature of the coil ends 1 usually raises, so that the coolant flowing down on the coil end 1 absorbs the heat and increases in temperature thereof, thus resulting in a decrease in effect of the coolant in cooling a portion of the coil end 1 including the lower portion S7. The coolant, as having flowed along the extension 13, drops onto the lower portion, especially, the lower half of the coil end 1 with the temperature thereof being kept low, so that the lower portion of the coil end 1 is cooled well.

The structure of the cooling mechanism of the electric rotating machine M of this embodiment offers the following advantages.

The electric rotating machine M, as described already with reference to FIG. 1, includes the coolant supply pipe 4 defining a coolant supply path through which the coolant is fed from the pump 10 into the casing 2 and the coolant channels 3 shaped like gutter to which the coolant flows from the coolant supply pipe 4 and which define flow paths extending from the coolant supply path to the coil ends 1. Each of the coolant channels 3 has the flow separator 12 and the partition wall 3c disposed in the flow path thereof. The flow separator 12 splits a flow of the coolant having entered the coolant channel 3 into two streams and defines the chamber 20 within which one of the streams is blocked and then drained from the right group 11b of the outlets 11. The partition wall 3c defines the second chamber 40 to which the other stream of the coolant enters and which partially drains it from the left group 11a of the outlets 11. Almost the whole of the coil ends 1 is cooled well by selecting the size, the configuration, and/or the number of the outlets 11 in each of the left and right groups 11a and 11b. The two chambers 20 and 40 serve to distribute the coolant both to the left group 11a of the outlet 11 and to the right group 11b of the outlets 11, thus cooling almost the whole of the coil ends 1, as demonstrated in FIG. 4(b), even if the electric rotating machine M is tilted.

The beneficial feature of each of the coolant channels 3 is that the flow separator 12 splits a flow of the coolant into two streams: one of which continues to flow toward the left group 11a of the outlets 11 and then drains onto a left half of the coil end 1 and other of which is stopped at the end wall 12b and then drains onto a right half of the coil end 1. The left half and the right half of the coil end 1 are separate from one another in a radius direction of the axis of the stator 5, in other words, a direction in which the rotor 8 rotates. The coolant is, therefore, supplied to almost the whole of the coil end 1 even when the electric rotating machine M is tilted to the angle θ, as illustrated in FIG. 4(b).

The partition wall 3c and the end wall 12b of the flow separator 12, as described above, create pools of the coolant, but need not necessarily to do so. For example, the partition wall 3c may be omitted to define the chamber 40 including an inner chamber of the extension 13. The end wall 12b may be omitted or alternatively have formed therein an opening or a slit through which a portion of the stream of the coolant, as having entering the chamber 20, escapes to the chamber 40.

The flow separator 12 is made of a plate (i.e., the flow split wall 12a) which has a given height and extends in a direction in which the coolant flows in the flow path, as defined by the coolant channel 3, to split the flow of the coolant into the first and second coolant streams. The first coolant stream flows to the left group 11a of the outlets 11. The second coolant stream flows to the right group 11b of the outlets 11. The height of the plate needs not necessarily be identical with that of the side walls 3a. The amount of the coolant to be fed to the chamber 40 may be determined by selecting the height of the flow split wall 12a and the end wall 12b.

The coolant channel 3 also includes the extensions 13 each of which defines an additional flow path from which the coolant is partially drained onto the coil end 1. The additional flow paths extend below the right and left groups 11a and 11b of the outlets 11 in a direction of gravitational force to drop a portion of the coolant directly onto a lower portion of the coil end 1 and also to right and left circumferential portions of the coil end 1. Either one of the extensions 13 may be omitted.

The coolant channel 3 includes the inlet guide 14 through which the coolant flows from the coolant supplying mechanism to the flow path in the coolant channel 3. The inlet guide 14 ensures the stability in supplying the coolant to the flow path of the coolant channel 3 even when the electric rotating machine M is tilted undesirably.

Each of the extension 13 is elongated in the lengthwise direction of the flow channel 3. Each of the extension 13, as described above, faces a circumferential surface of the coil end 1 and is away from the circumferential surface at a given interval which is so selected as to create the capillary action which attracts the coolant partially into the air gap to cool an upper portion of the coil end.

Each of the extension 13 has a channel which directs a portion of the stream of the coolant entering the chamber 40 to a portion of the circumference of the coil end 1, thereby improving the effect of cooing a circumferential portion of the coil end 1.

Figure 7A:
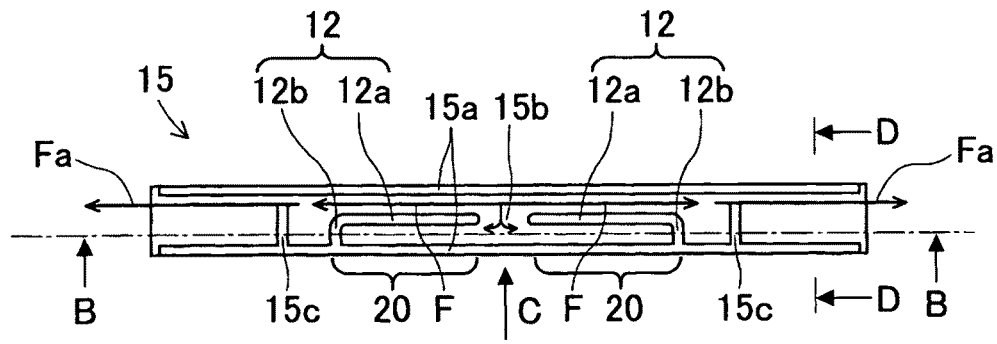
FIG. 7(a) is a top view which illustrates a coolant channel to be installed in the electric rotating machine of FIG. 1 according to the second embodiment of the invention.
Figure 7B:
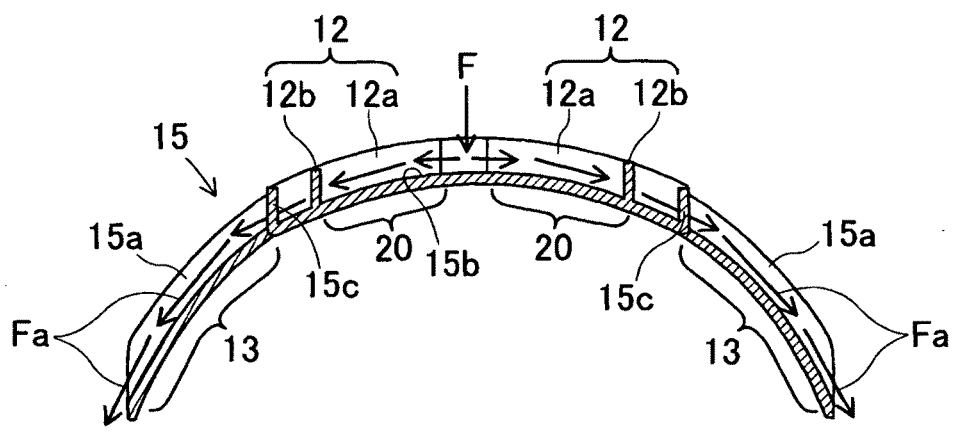
FIG. 7(b) is a longitudinal sectional view of the coolant channel, as taken along the line B-B in FIG. 7(a)
Figure 7C:
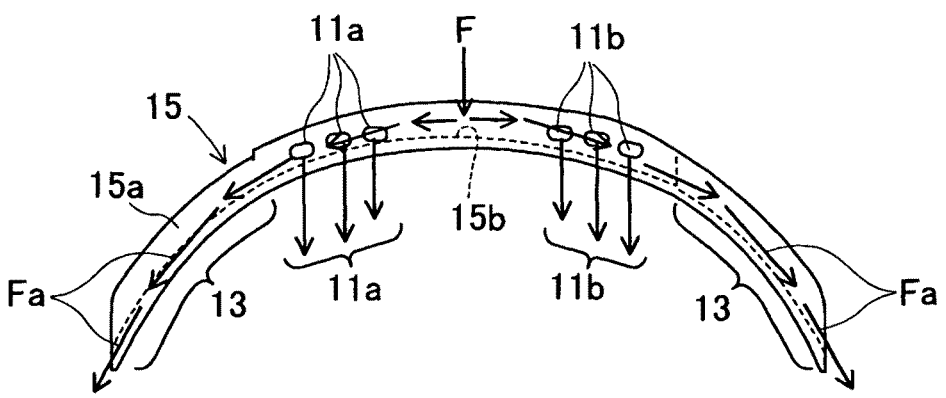
FIG. 7(c) is a side view of the coolant channel, as viewed from an arrow C in FIG. 7(a)

FIGS. 7(a) to 7(c) illustrate a coolant channel 15 according to the second embodiment which is used in the electric rotating machine M of FIG. 1 instead of each of the coolant channels 3. FIG. 7(a) is a plane view which shows the coolant channel 15. FIG. 7(b) is a longitudinal section view of the coolant channel 15, as taken along line B-B in FIG. 7(a). FIG. 7(c) is a side view of the coolant channel 15, as viewed from an arrow C in FIG. 7(a). The same reference numbers as employed in the first embodiment refer to the same parts, and explanation thereof in detail will be omitted here.

The coolant channel 15, unlike the coolant channel 3 of the first embodiment, does not have the inlet guide 14 and is different from the coolant channel 3 in structure. The coolant channel 15 is, as clearly illustrated in FIG. 7(a), substantially symmetrical with respect to the vertical center line of the drawing. The coolant (not shown) is supplied from the pump 10 through the coolant supply pipe 4 and drops directly on the center of the top of the coolant channel 15, as indicated by arrow F in FIG. 7(b) or 7(c).

The coolant channel 15 has, as clearly illustrated in FIGS. 7(a) and 7(b), a body made up of side walls 15a and a bottom 15b, two flow separators 12, and two curved extensions 13. The flow separators 12 and the extensions 13 are disposed symmetrically with respect to the center of the body in a lengthwise direction of the body. Each of the flow separators 12 is, like in the first embodiment, made up of the flow split wall 12a and the end wall 12b. The flow separators 12 define the chambers 20, respectively, which are opposed to one another mirror-symmetrically. The side wall 15a, as illustrated in FIG. 7(c), has the outlets 11 from which the coolant is drained onto the coil end 1. The outlets 11 are broken down into left and right groups 11a and 11b which communicate with the right and left chambers 20, respectively. The coolant drained from the left group 11a of the outlets 11 drops onto and, as illustrated in FIGS. 2 and 4(a), flows along the left half of the coil end 1 to cool it. Similarly, the coolant drained from the right group 11b of the outlets 11 drops onto and, as illustrated in FIGS. 2 and 4(a), flows along the right half of the coil end 1 to cool it.

The flow separators 12 split a flow of the coolant having dropped on the top center of the coolant channel 15 into three streams: one flowing to the right side, as viewed in the drawing, the second to the left side, and the third to the chambers 20. The structure of the coolant channel 15 of this embodiment, like in the first embodiment, works to distribute the coolant to the right, left, upper, and lower portions of the coil end 1 to cool almost the whole of the coil end 1 even when the electric rotating machine M is tilted, like in FIG. 4(b).

FIGS. 8(a) and 8(b) illustrate a coolant channel 16 according to the third embodiment which is used in the electric rotating machine M of FIG. 1 instead of each of the coolant channels 3. FIG. 8(a) is a plane view which shows the coolant channel 16. FIG. 8(b) is a longitudinal section view of the coolant channel 16, as taken along line B-B in FIG. 8(a). The same reference numbers as employed in the first embodiment refer to the same parts, and explanation thereof in detail will be omitted here.

The coolant channel 16 has a body made up of side walls 16a and a bottom 16b, a flow separator 12, a partition wall 16c, and extensions 13. The side walls 16a and the bottom 16b are substantially identical in shape with the side walls 3a and the bottom 3b in the first embodiment. The partition wall 16c is identical in structure and operation with the partition wall 3c in the first embodiment. The side wall 16a, like in the first embodiment, has the outlets 11 (not shown in FIGS. 8(a) and 8(b)). The bottom 16b has formed therein outlets 11 four of which communicate with the chamber 40 and two of which communicate with the chamber 20. The bottom wall 16b may have at least two outlets 11, one for each of the chambers 20 and 40. Some of the outlets 11 through which the coolant flows from the chamber 20 are, like in the first embodiment, preferably designed to be different in size, shape, and/or number from remaining ones of the outlets 11 through which the coolant flows from the chamber 40 in light of inclination of the electric rotating machine M.

FIG. 9 is a partially enlarged view of the electric rotating machine M which represents streams of the coolant emerging from the coolant channel 16. The coolant, as drained from the outlets 11 in the side wall 16a of the coolant channel 16, flows along the outer side surface 1b and drops from the inner circumferential surface 1c of the coil end 1. The coolant, as drained from the outlets 11 in the bottom 16b of the coolant chamber 16, drops onto the outer surface 1a and flows down along the inner side surface 1b to the inner circumferential surface 1c of the coil end 1. The distribution of the coolant to the entire surface of the coil end 1 may be achieved by regulating open areas of the outlets 11.

The flow separator 12, like in the first embodiment, works to distribute the coolant to the chambers 20 and 40, respectively, so that the coolant drops from the outlets 11 of the bottom 16b onto the right and left portions of the coil end 1.

Even when the electric rotating machine M is tilted, the chamber 20 ensures the stability in supplying the coolant to the selected portion of the coil end 1.

Figure 10A:
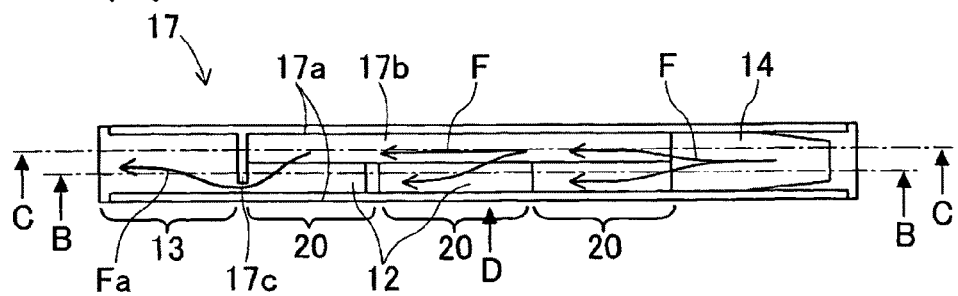
FIG. 10(a) is a top view which illustrates a coolant channel to be installed in the electric rotating machine of FIG. 1 according to the fourth embodiment of the invention.
Figure 10B:
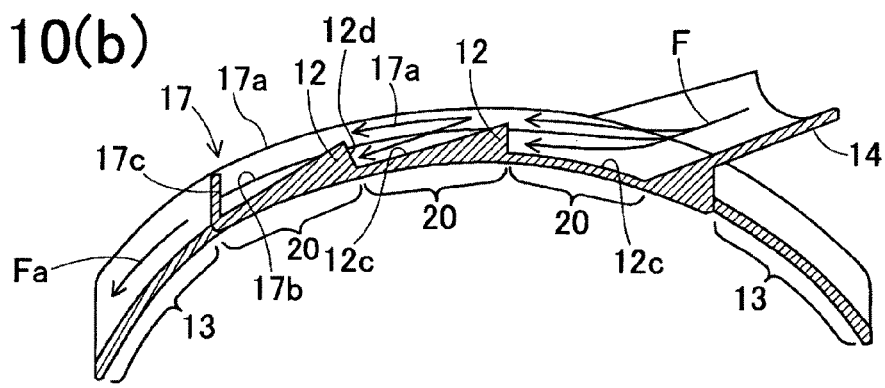
FIG. 10(b) is a longitudinal sectional view of the coolant channel, as taken along the line B-B in FIG. 10(a)
Figure 10C:
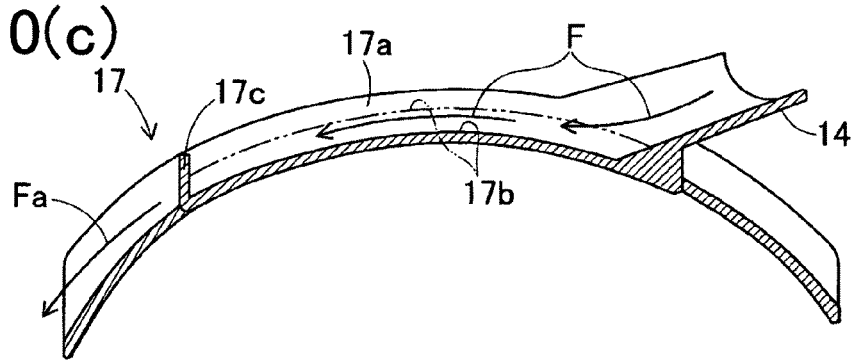
FIG. 10(c) is a longitudinal sectional view of the coolant channel, as taken along the line C-C in FIG. 10(a)
Figure 10D:
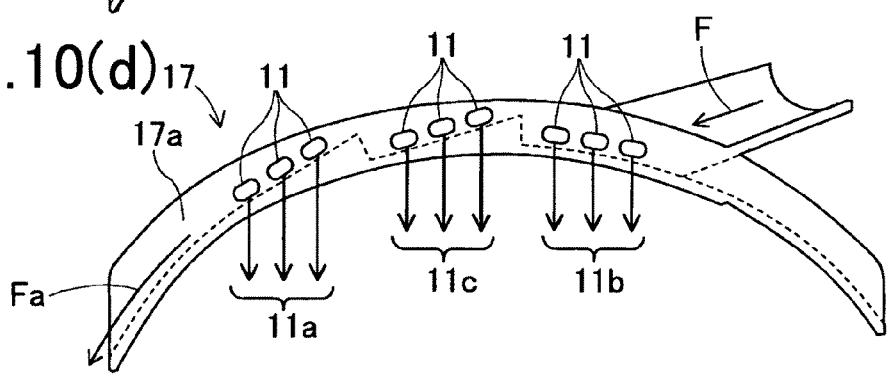
FIG. 10(d) is a side view of the coolant channel, as viewed from an arrow D in FIG. 10(a).

FIGS. 10(a) to 10(d) illustrate a coolant channel 17 according to the fourth embodiment which is used in the electric rotating machine M of FIG. 1 instead of each of the coolant channels 3. FIG. 10(a) is a plane view of the coolant channel 17. FIG. 10(b) is a longitudinal section view, as taken along the line B-B in FIG. 10(a). FIG. 10(c) is a longitudinal section view, as taken along the line C-C in FIG. 10(a). FIG. 10(d) is a side view, as viewed from an arrow C in FIG. 10(a). The same reference numbers as employed in the first embodiment will refer to the same parts, and explanation thereof in detail will be omitted here.

The coolant channel 17, like in the first embodiment, has a body made up of side walls 17a and a bottom 17b, two flow separators 12, a partition wall 17c, and extensions 13. The flow separators 12 are formed on a lower half thereof, as viewed in FIG. 10(a). In other words, the flow separators 12 are formed on a longitudinally extending half of the bottom 17b which faces outlets 11 from which the coolant drains. The flow separators 12 are of a wedge-shape in a longitudinal cross section thereof, in other words, each shaped in a stepwise form and arrayed in alignment with a direction in which the coolant flows. Each of the flow separators 12 is made up of a bottom wall (i.e., a step) 12c and an upright end wall 12d. The bottom wall 12c tapers downstream of flow of the coolant, but may alternatively be so shaped as to extend substantially parallel to the bottom 17b of the coolant channel 17. In other words, the bottom wall 12c may extend substantially along the curvature of the bottom 17b or a main flow of the coolant in the coolant chamber 17. It is, however, preferable for the bottom wall 12c to be inclined to the bottom 17b (i.e., the curvature) of the coolant channel 17 at an angel great enough to accumulate a required amount of the coolant in the chamber 20. The upright end wall 12d may extend substantially perpendicular to the bottom 17b. Each of the flow separators 12, as can be seen in FIGS. 10(a) and 10(b), separates a space within the coolant channel 17 to define a chamber 20 and splits a flow of the coolant into two streams. Specifically, the upright end walls 12d of the flow separators 12 and the partition wall 17c define the three chambers 20 which are arrayed in alignment with the flow of the coolant and into which the coolant is to enter and function as a stopper to block or stop the flow of the coolant to create pools of the coolant. Each of the chambers 20 may alternatively be defined by increasing the thickness of the bottom 17b and extending either or both of the upright end walls 12c downward below the bottom 17b. In other words, the flow separator 12 may alternatively be made by a wedge-shaped recess formed in the bottom 17b, so that a corner of the flow separator 12 between the bottom wall 12c and the upright end wall 12d lies an upper half of the bottom 17b, as viewed in FIG. 10(a). The side wall 17a, as illustrated in FIG. 10(d), has formed therein outlets 11. The outlets 11 are broken down into three groups: a left group 11a, a right group 11b, and a middle group 11c. Each of the groups 11a, 11b, and 11c of the outlets 11 communicates with one of the chambers 20 to drain a corresponding one of the pools of the coolant onto the coil end 1 in the same manner as described in the first embodiment. The coolant channel 17 may alternatively be designed to only have upstream two of the chambers 20 or upstream two of the groups 11a, 11b, and 11c of the outlets 11.

The upper half of the bottom 17b of the coolant channel 17, as viewed in the drawing, does not have the flow separators 12, in other words, has a flat surface along which the coolant flows. The flat surface of the upper half of the bottom 17b is indicated by a solid line in FIG. 10(a), or a two-dot chain line in FIG. 10(c). The upper half of the bottom 17b creates a coolant path for a single flow of the coolant which is divided by the flow separates 12. The chambers 20, as described above, create the pools of the coolant, respectively. The coolant is, as clearly illustrated in FIG. 10(d), drained from the pools in the chambers 20 through the left, right, and middle groups 11a, 11b, and 11c of the outlets 11 onto the coil end 1.

Each of the coolant channels 17 of this embodiment is, as described above, designed to have the flow separators 12 shaped in the stepwise form. The bottom wall (i.e., a step) 12c of the flaw separator 12 tapers downstream of the flow of the coolant, in other words, is so inclined as to have a downslope to determine the volume of the chamber 20. Each of the flow separates 12 splits a flow of the coolant into two streams: one flowing along the straight flow path extending from the inlet guide 14 to a left one of the extension 13, as viewed in FIG. 10(a), and the second flowing into one of the chambers 20. The chamber 20 stores the stream of the coolant to create a pool. The left, right, and middle groups 11a, 11b, and 11c of the outlets 11 drain the coolant, as stored in the chambers 20, to different portions of the coil end 1 to cool them. Like in the above embodiment, even when the electric rotating machine M is tilted, the coolant channel 17 of this embodiment ensures the stability in supplying the coolant to almost the whole of the coil end 1.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The cooling mechanism for the electric rotating machine M may be designed to have a combination of two or more of the features of the above described first to fourth embodiments.

For instance, the first and third embodiments may be designed to have the two or more flow separators 12, while the second and fourth embodiments may be designed to have the single or three or more flow separators 12. Each of the coolant channels 3, 1S, 16, or 17 may be constructed to have the at least one flow separator 12, thereby creating at least two streams of the coolant which are to be drained to the coil end 1 of the electric rotating machine M.

The flow separator 12 of the first and third embodiments is, as illustrated in FIGS. 3(a) and 8(a), of a one-piece structure defining the flow split wall 12a and the end wall 12b serving as the flow stopper to create a pool of the coolant, however, the flow split wall 12a and the end wall 12b may be made of separate plates or a member(s) other than a plate. For instance, either or both of the flow split wall 12a and the end wall 12b may be made of a mesh- or lattice-like member or a fence made of an array of parallel strips.

The flow split wall 12a and the end wall 12b of each of the flow separators 12 of the second embodiment illustrated in FIGS. 7(a) to 7(c) may alternatively be made of separate members, like in the above described modification. The bottom wall 12e and the end wall 12d of each of the flow separators 12 of the coolant channel 17 of the fourth embodiment may also be made to be separate from each other. Instead of the flow separator(s) 12, each of the coolant channels 3, 15, 16, or 17 may be constructed to have a protrusion(s) or a mesh-like member(s) on the bottom thereof which splits a flow of the coolant into two or more streams of the coolant which are to be drained from the outlets 11 in the same manner as described above.

The coolant supply pipe 4 in the first to fourth embodiments is of a circular in transverse cross section, but may be made to have a polygonal shape such as oval, or triangle or another shape.

The electric rotating machine M of each of the first to fourth embodiments is equipped with the pump 10 which feeds the coolant directly to the coolant supply pipe 4, but may have a tank disposed between the coolant supply pipe 4 and the pump 10. The tank stores therein the coolant, as fed from the pump 10, and feeds it at a pressure produced by accumulation of the coolant in the tank. The tank is usually cooled naturally, thus eliminating the need for an oil cooler. The tank may alternatively be installed inside the electric rotating machine M.

What is claimed is:

1. An electric rotating machine comprising:
    a rotor;
    a rotating shaft which is to be rotated by the rotor;
    a stator which faces a circumference of the rotor, the stator having a coil which is so wound as to have coil ends extending outside an end of the stator in an axial direction of the stator;
    a coolant channel which has defined therein a flow path through which coolant flows;
    a coolant supplying mechanism which supplies the coolant to the coolant channel;
    a flow separator disposed in the coolant channel, the flow separator working to separate a flow of the coolant into at least two streams; and
    a first and a second outlet, the first outlet communicating with a first coolant stream that is one of the two streams, as produced by the flow separator, the second outlet communicating with a second coolant stream that is the other of the two streams, the first and second outlets draining the coolant to different portions of the coil end, and
    wherein the flow separator has a stopper wall to stop the first coolant stream to create a pool of the coolant to which the first outlet opens.

2. An electric rotating machine as set forth in claim 1, wherein the flow separator is made of a plate which has a given height and extends in a direction in which the coolant flows in the flow path to split the flow of the coolant into the first and second coolant streams.

3. An electric rotating machine as set forth in claim 1, wherein the flow separate is made of a wedge-shaped protrusion to define a chamber into which the first coolant flow enters, the first outlet opening into the chamber.

4. An electric rotating machine as set forth in claim 1, wherein the coolant channel also includes an extension which defines an additional flow path from which the coolant is partially drained onto the coil end, the additional flow path extending below the first and second outlets in a direction of gravitational force.

5. An electric rotating machine as set forth in claim 1, wherein the coolant channel includes an inlet guide through which the coolant flows from the coolant supplying mechanism to the flow path in the coolant channel.

6. An electric rotating machine as set forth in claim 1, wherein the flow separator has an extension elongated in a lengthwise direction of the coolant channel, the extension faces a circumferential surface of the coil end and being away from the circumferential surface at a given interval which is so selected as to create capillary action which attracts the coolant partially into an air gap between the extension and the circumferential surface of the coil end to cool a given portion of the coil end.

7. An electric rotating machine as set forth in claim 6, wherein the extension has a channel which directs a portion of the second coolant stream to a portion of a circumference of the coil end.

8. An electric rotating machine as set forth in claim 1, wherein the coolant channel has a side wall in which the first and second coolant outlets are formed.

9. An electric rotating machine as set forth in claim 1, further comprising a third coolant outlet formed in a bottom of the coolant channel.

* * * * *